United States Patent
Hoover (10) Patent No.: US 7,324,505 B2
(45) Date of Patent: Jan. 29, 2008

(54) SUSTAINED VOIP CALL LOGS USING POC CONTACT LISTS

(76) Inventor: Christopher Hoover, 1031 Doris Ct., Alameda, CA (US) 94501

( * ) Notice: Subject to any disclaimer, the term of this patent is extended or adjusted under 35 U.S.C. 154(b) by 261 days.

(21) Appl. No.: 11/127,911

(22) Filed: May 11, 2005

(65) Prior Publication Data

US 2006/0140173 A1 Jun. 29, 2006

Related U.S. Application Data

(60) Provisional application No. 60/639,001, filed on Dec. 24, 2004.

(51) Int. Cl.
*H04L 12/66* (2006.01)

(52) U.S. Cl. ........................ 370/352; 370/354; 370/355; 379/88.26; 379/207.02; 379/207.04

(58) Field of Classification Search ................. 370/352, 370/354, 355; 379/88.26, 207.02, 207.04
See application file for complete search history.

(56) References Cited

U.S. PATENT DOCUMENTS

| | | | | |
|---|---|---|---|---|
| 2004/0223599 A1* | 11/2004 | Bear et al. | ............. | 379/207.02 |
| 2005/0074109 A1* | 4/2005 | Hanson et al. | ......... | 379/207.04 |
| 2005/0117729 A1* | 6/2005 | Reding et al. | ............. | 379/196 |
| 2006/0041923 A1* | 2/2006 | McQuaide, Jr. | ............. | 725/131 |
| 2006/0062205 A1* | 3/2006 | Doherty et al. | ............. | 370/352 |
| 2006/0126806 A1* | 6/2006 | Trandal et al. | ........... | 379/88.26 |

* cited by examiner

*Primary Examiner*—Sanh D. Phu (57) ABSTRACT

A method for logging Voice Over IP (VOIP) calls from a caller client device to a recipient client device. The method includes the steps of generating a VOIP call from the caller client device directed to the recipient client device; storing identification information associated with the caller client device in server call log resident on a hyper text transfer protocol (HTTP) server associated with the recipient client device; generating an update request at the recipient client device requesting updated call log information associated with the server call log from the HTTP server; transmitting the updated call log information from the HTTP server to the recipient client device; and updating a client call log resident on the recipient client device in response to the updated call log information.

32 Claims, 6 Drawing Sheets

SUSTAINED VOIP CALL LOGS USING POC CONTACT LISTS

RELATED APPLICATIONS

This application claims priority to Prov. No. 60/639,001 filed Dec. 24, 2004, incorporated herein by reference.

FIELD

The present invention relates in general to cellular communication technologies and in particular to a method of logging Voice Over IP (VOIP) calls to a client device.

BACKGROUND

Mobile cellular communication is evolving beyond traditional voice telephony towards more sophisticated services, such as Push-To-Talk (PTT). Similar to conventional walkie-talkie communication, PTT is a type of Voice Over IP (VOIP) communication that enables mobile communication users to send a voice message to one or more recipients over a mobile phone by simply pushing a key (i.e., PTT button, etc.).

One particular version of PTT, called PoC (PTT-over-Cellular), has started to be implemented in wireless data networks such as GSM/GPRS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

It is desirable to be able to provide users a log of received VOIP calls so that they may, for example, take note of missed calls. The desired call log functionality is similar to that which is common to most cell phones, in which a log of received calls and missed calls are stored in the cell phone. However, integration of call logs within phones with the VOIP client in such a way as to provide dual purpose logs (VOIP and circuit switched) is problematic for two primary reasons:

First, the integrated log API changes from device to device, thus adding complexity to a porting effort. Porting would require VOIP client customization to support a particular logging API.

Second, the integrated log APIs may only support a string as an entry without providing for multiple fields. PTT logs require a SIP URI and other PTT-specific information. Thus, the integrated log may not be fully functional as a PTT log.

PoC is discussed in greater detail in the following technical specifications which are incorporated by reference: Push-to-talk over Cellular (PoC), Architecture, PoC Release 2.0, V2.0.8 (2004-06); Push-to-talk over Cellular (PoC), Signaling Flows—UE to Network Interface (UNI), PoC Release 2.0, V2.0.6 (2004-06); and Push-to-talk over Cellular (PoC) User Plane, Transport Protocols, PoC Release 2.0, V2.0.8 (2004-06); PoC XDM Specification, OMA-PoC_XDM_Specification-V1_0-20041118-D; Shared XDM Specification, OMA-Shared_XDM_Specification-V1_0-20041118-D; OMA PoC Control Plane, OMA-POC-Control-Plane-V1_0-20041118-D; XML Document Management (XDM) Specification, OMA-XDM_Specification-V1_0-20041118-D; Authorizing who can subscribe to XCAP change event package, OMA-XDM_Specification-V1_0-20041118-D; Sample XCAP Call Flows, OMA-XDM_Specification-V1_0-20041118-D.

Of note, Release 1.0 is also available from the PoC Consortium as well as an upcoming PoC standard from Open Mobile Alliance (OMA). All of these are generally considered native PoC standards. Subsequently, a UE (user equipment), such as a PoC enabled cellular phone, supporting either of these standards is called a native PoC client. Additional information is found in IETF RFC 3261, which is incorporated herein by reference. This document describes Session Initiation Protocol (SIP), which is an application-layer control (signaling) protocol for creating, modifying, and terminating sessions with one or more participants. These sessions include Internet telephone calls, multimedia distribution, and multimedia conferences.

SUMMARY

One aspect of the present invention is a method for logging Voice Over IP (VOIP) calls from a caller client device to a recipient client device. The method includes the steps of generating a VOIP call from the caller client device directed to the recipient client device; storing identification information associated with the caller client device in server call log resident on a hyper text transfer protocol (HTTP) server associated with the recipient client device; generating an update request at the recipient client device requesting updated call log information associated with the server call log from the HTTP server; transmitting the updated call log information from the HTTP server to the recipient client device; and updating a client call log resident on the recipient client device in response to the updated call log information.

The identification information may include the SIP URI of the caller client device, the time the VOIP call was generated, the date the VOIP call was generated, and the nickname of the caller client device. Additionally, the server call log may be associated with multiple client devices.

The method may also include the step of notifying the recipient client device of the presence of a new VOIP call stored in the server call log. The notification may be done by a XCAP or SMS message. Other steps of the method may include use of a reject list or do not disturb list to block VOIP calls to the recipient client device while still logging the blocked VOIP calls.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to PoC applications, while other types of real-time multimedia applications can be used in the invention. Likewise, reference is made to PTT calls, while the present invention can be applied to other types of VOIP calls.

A. Overview

A contact list may be used to enable logging of calls and storage of the logged calls as part of the GLMS (Group List Management Server). A user, when provisioned, is associated with two new contact lists (a group type and a user type). These lists are in addition to any contact lists that might otherwise be provisioned. Per the PoC List Management and Do-not-Disturb (DnD) v1.1.3 (2003-08) specification, a contact list may be associated with a display name. In this case, the contact lists, both group and user types, are associated with a display name, for example, "Group call log" and "User call log" respectively.

The present invention leverages PTT contact lists as defined in the PoC specifications to enable logging of incoming PTT calls. Using this log, a user can view all calls received by another PTT user, including those calls attempted when offline or when DnD was enabled.

The PoC standards provides for the creation of zero or more contact lists. In addition to the implicit attribute of the owner, the contact list has the following attributes: Contact list identity; Display name; Type (user or group); Default (Yes/No); Timestamp; List of user or group identities where each identity is a tuple (a data object containing two or more components) containing Uniform Resource Identifier (URI) and Display name (optional).

The URI of the entry in the contact list is specified as "scheme:scheme-specific-part". Each display name is represented as an UTF8-encoded UNICODE string. The system allows the URI to be both SIP URI and TEL URI. The tuples within the list of user or group identities are uniquely identified by their URI portion of the tuple. No two tuples in the list have the same URI.

The type attribute specifies the type of entries, either user or group, within the list. The user stores his user contacts to user type lists and his group contacts to group type lists. All entries within a single list are of the same type. The presence service uses only user type contact lists.

The timestamp is used in order to make caching of lists possible on the UE. This timestamp is made to appear after the display name so that the user can see when a particular entry was added to the call log.

The default attribute is used to enable the UE to identify the user's default contact list. If the value of this attribute is "Y" then the contact list is the default, otherwise the value of this attribute is "N" and the contact list is not the default. The usage of the default attribute is UE specific. The system ensures that there is only one default contact list for the user. The way in which the UE presents the default attribute to the end user is implementation defined. The call log can optionally be set to be the default contact list for a user, even though this is not the normal case.

B. Architecture

Figure 1:
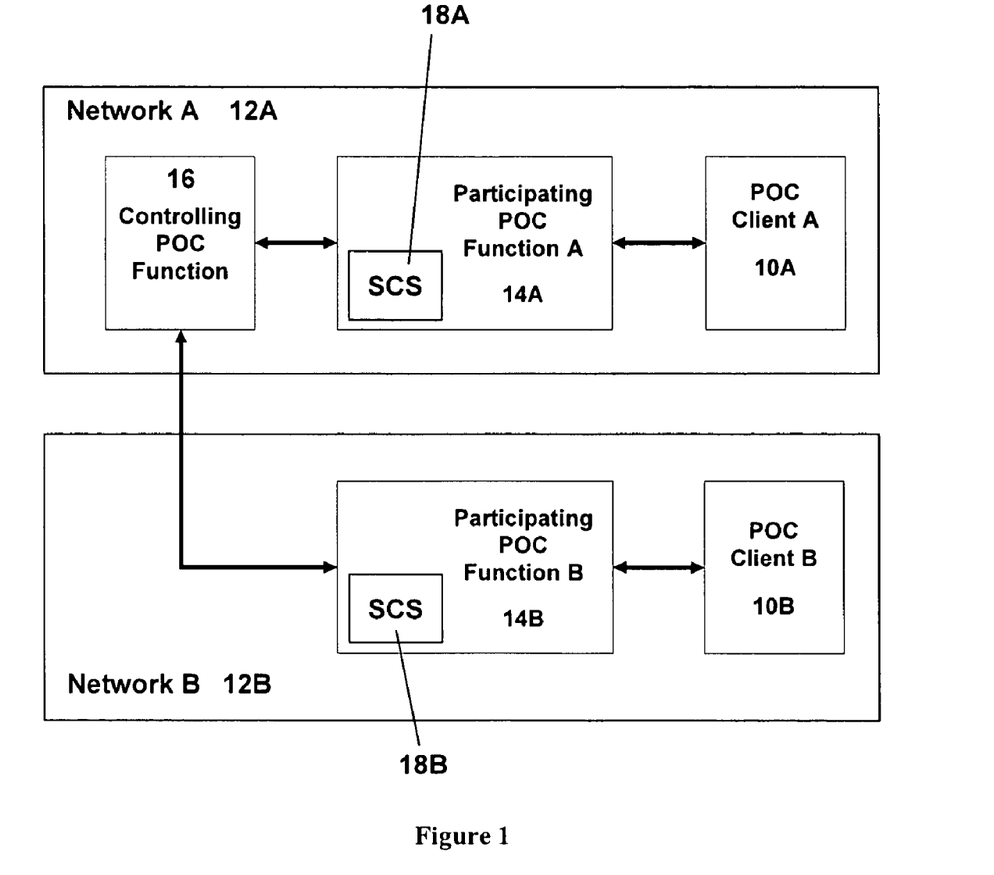
FIG. 1 is a combination block diagram and flow chart illustrating messages sent between two PoC Networks.

The PoC environment relies on PoC servers to send and receive PTT calls. FIG. 1 illustrates the basic functionality of the system of the preferred embodiment for a PoC client (UE) 10*a* on one PoC Network 12*a* and another PoC client 10*b* on another PoC Network 12*b*. The Participating PoC Function 14*a*/14*b* and the Controlling PoC Function 16 shown in FIG. 1 manage the flow of messages and voice bursts across the PoC environment.

The Service Capability Server (SCS) 18 found within each Participating PoC function 14 handles the communication interface between PoC and outside services such as Short Message Service (SMS) and infotainment services that may be offered by the carrier. The SCS 18 is essentially a secure gateway between the underlying network and an outside application (e.g. SMS Center). The Controlling PoC Function 16 resides within the Network 12*a* of the UE 10*a* sending the call invitation. The PoC Network 12*a* of UE 10*a* provides both Controlling PoC Functions 16 and Participating PoC Functions 14.

Figure 2:
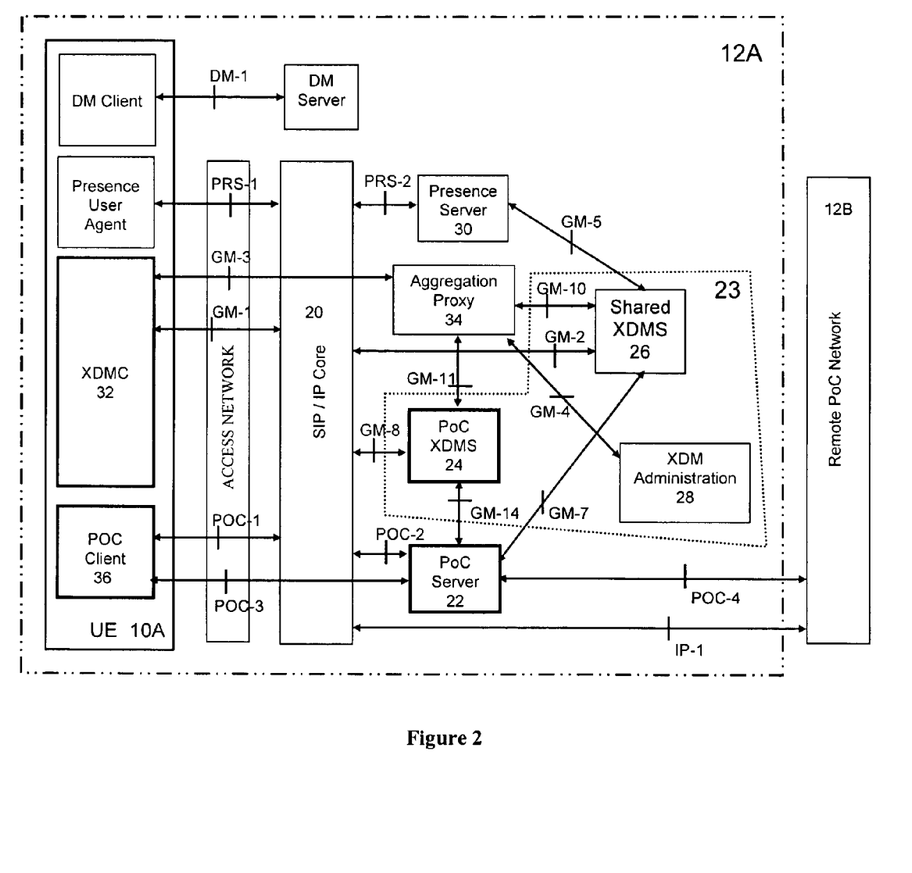
FIG. 2 is a combination block diagram and flow chart illustrating the components of the UE of the preferred embodiment and messages sent within the UE and between the UE and the PoC System.

FIG. 2 depicts the various elements of the PoC Networks 12 and the interfaces that connect them. In FIG. 2, the PoC Networks 12 consist of a SIP/IP Core 20, PoC Server 22, XCAP Document Management Server (XDMS) 23 (comprising the following elements: PoC XMDS 24, Shared XDMS 26, and XDM Administration 28), and Presence Server 30. The XDMS 23 is an HTTP server that understands how to follow the naming and validation constraints defined in this specification. The XDMS 23 elements interface directly and indirectly with UE 10 (and its internal components) and the Remote PoC Network 12*b* (GPRS connection). The four entities that control the flow of lists, such as call logs between the UE 10 and the other components of the PoC Network 12, are 1) the XDMC 32 (XDM Client application on the UE 10), 2) the Aggregation Proxy 34, 3) the PoC XDMS 24 (XDM Server within the PoC network 12), and 4) the Shared XDMS 26 (for lists that are shared across multiple PoC users and/or services). These four entities handle all lists created and maintained in the system, both shared and individual lists. Since the PoC Server 22 interacts directly with the PoC XDMS 24 and the Shared XDMS 26, when PTT sessions are created, to add these calls are added to the call logs. The PoC entities in network 10 are the PoC XDMS 24, PoC Server 22, XDMC 32, and PoC client 36.

C. Process Flows

Figure 3:
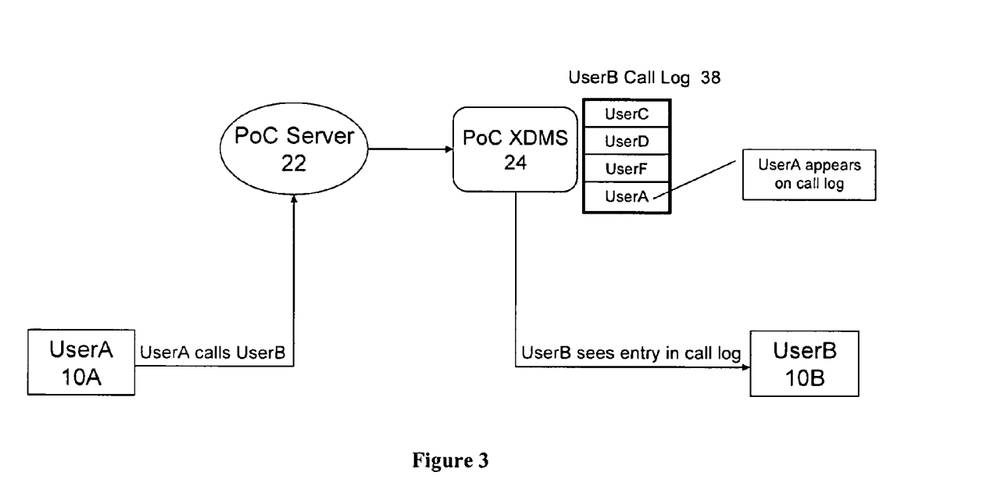
FIG. 3 is a combination block diagram and flow chart illustrating the one to one caller PTT process flow of the preferred embodiment.

When UserA with UE 10*a* attempts to make a PTT call to UserB with 10*b*, UserA's SIP URI shall be placed on UserB's "user call log" contact list (type=user) by the PoC XDMS 24. FIG. 3 illustrates the process by which an entry is added to a call log.

As shown in FIG. 3, UserA with UE 10*a* calls UserB with UE 10*b* and the call is logged on UserB's Call Log 38. The display name that appears in the call log 38 is a configurable parameter that can show information such as the Mobile Subscriber ISDN (MSISDN) of the caller (i.e., the telephone number of the caller), the timestamp, and the date of the call. It is also possible to configure the system of the preferred embodiment to first check if UserA's SIP URI is already on any of UserB's contact lists. Note that under OMA specifications there can be multiple contact lists. If there is a match, the matching SIP URI from the contact list will be placed on the call log 38. In this way, the call log 38 will retain the display name chosen by UserB. Each call log contact list is associated with a maximum length, defined by a settable parameter within the Shared XDMS 26 of the PoC system. When that length is reached, any new incoming calls are placed on the list at the same time the oldest entry on that list is removed.

Figure 4:
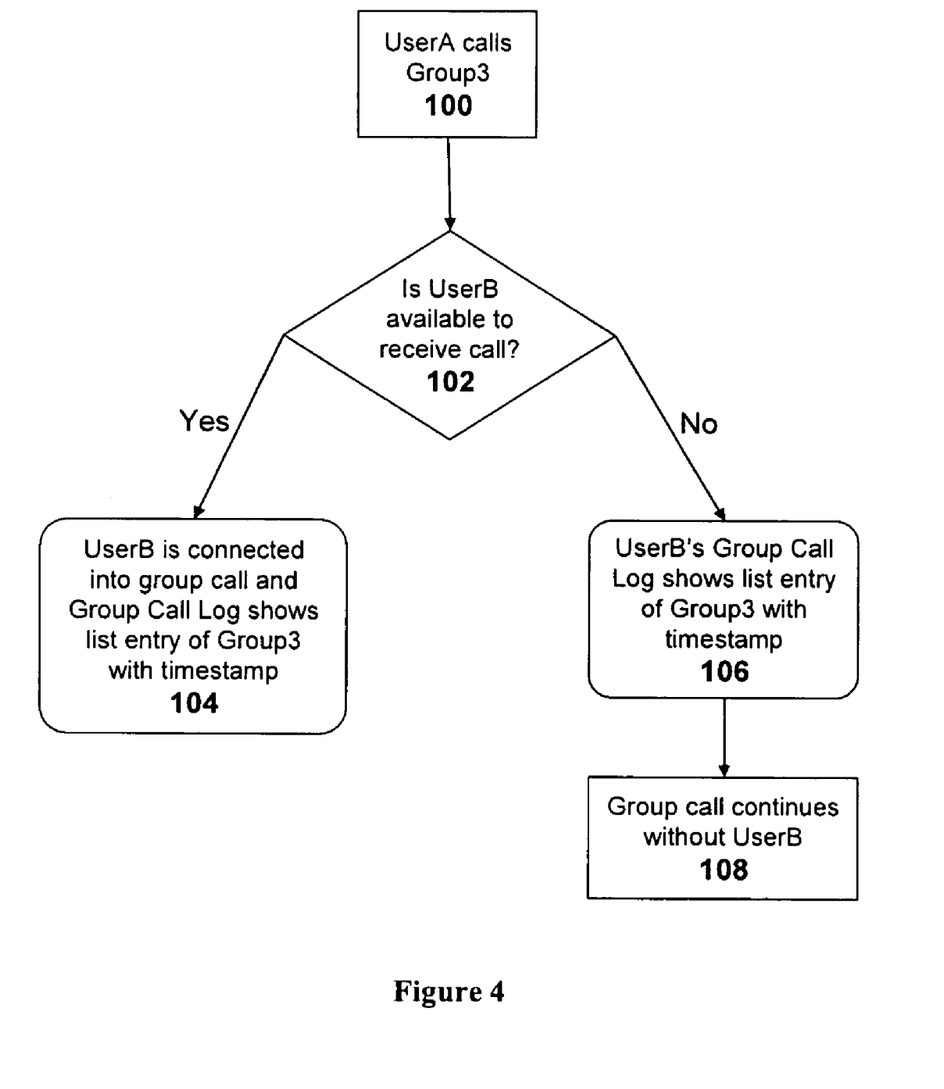
FIG. 4 is a flow chart illustrating the call log process flow of the preferred embodiment.

FIG. 4 illustrates the process by which a group call log entry is added to UserB's Group Call Log. If UserA calls UserB as part of a group call function, the group is placed on UserB's "group call log" contact list (type=group) in the same fashion. A timestamp appears after the group display name so UserB is informed of the time the call was received.

As depicted in FIG. 4, first, UserA calls a group, for example, group3, which contains multiple users including UserB (step 100). Next, PoC Server 22 (for UserB) determines if UserB is available to receive the call (step 102). UserB might not be available for several reasons, such as UE 10*b* is turned off or UE 10*b* is out of range. If UserB is available, UE 10*b* is connected into the group call initiated by USerA and UserB's group call log is updated with a list entry indicating a group3 call and a corresponding timestamp (step 104). If UserB is not available, UserB's group call log is updated with a list entry indicating a group3 call and a corresponding timestamp (step 106) and then the group call initiated by UserA continues without UserB (step 108). User call logs are processed in the same manner as depicted in FIG. 4, except if UserB is unavailable (as in step 106), no call occurs (in contrast to step 108).

Figure 5:
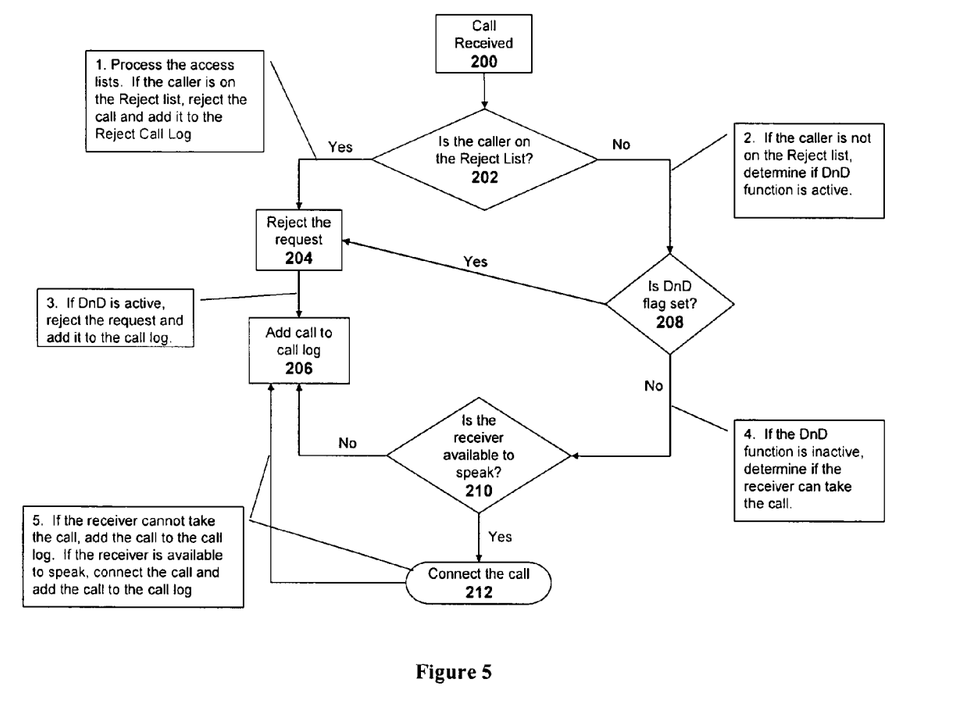
FIG. 5 is a flow chart illustrating the integrated do not disturb, reject list, and call log process flow of the preferred embodiment.

In addition to user unavailability, PTT calls may not be received if a recipient user has enabled Do-not-Disturb (DnD) or has blocked calls from the initiating user. FIG. 5 depicts the integration of the DnD list and Reject list (i.e., Access list) features with the call log feature. If the caller is on the receiver's Reject list, the call listing will appear in the reject call list and the caller is blocked. If the caller is not on the Reject list, the PoC Server processes the Do-not-Disturb flag as usual and routes the call appropriately. Because the PoC Server 22 will process incoming calls received when the receiving user has global DnD enabled or is offline, or when a call is initiated by a user on the recipient user's Reject list (i.e., Access list), these calls may also be stored in the call log 38 with a reason code for why the call was not successful.

As depicted in FIG. 5, incoming PTT calls to UserB are received by PoC Server 22 (step 200). Then, the PoC Server 22 determines if UserA is on UserB's Reject list (step 202). If UserA is on UserB's Reject list, the PTT call initiation request from UserA is rejected (step 204) and the PTT call initiation request is entered into UserB's call log 38 (step 206) with the reason code "on reject list". In order to avoid displaying any calls that are caught by the reject list, an alternate configuration provides a separate call log for these calls or to skip reject list calls completely from being logged.

With respect to DnD operations, a parameter (i.e., flag) is used to define whether or not DnD is enabled when incoming calls are stored in the call log 38. If a user's Do-not-Disturb flag is set to "Y", then the PoC server 22 blocks all incoming talk requests to the user. If this DnD flag is set to "N", then the PoC server shall block the incoming talk requests according to the access lists of the same owner.

Thus, if UserA is not on UserB's reject list, the PoC Server 22, then determines the status of UserB's DnD flag (step 208). If the DnD flag is set to "Y", the PoC Server 22 rejects the incoming PTT call initiation request (step 204) and the PTT call initiation request is entered into UserB's call log 38 with reason code DnD (step 206). If the DnD flag is set to "N", the PoC Server 22 determines if UserB is available (step 210), in the same manner as step 102 depicted in FIG. 4. If UserB is unavailable, the PoC Server 22 rejects the incoming PTT call initiation request (step 204) and the PTT call initiation request is entered into UserB's call log 38 with reason code unavailable (step 206). If UserB is available, the PoC Server 22 connects the PTT call (step 212) and the PTT call initiation request is entered into UserB's call log 38 with no extra reason code (step 206).

As shown in FIG. 5, the DnD and reject list functions are integrated with call logs. This ensures that a user will be able to track all incoming calls.

When a user wants to view a call log, a series of messages is sent from the XDMC 32 to the PoC XDMS 24 by way of the Aggregation Proxy 34. This message stream is shown in the FIG. 6.

Figure 6:
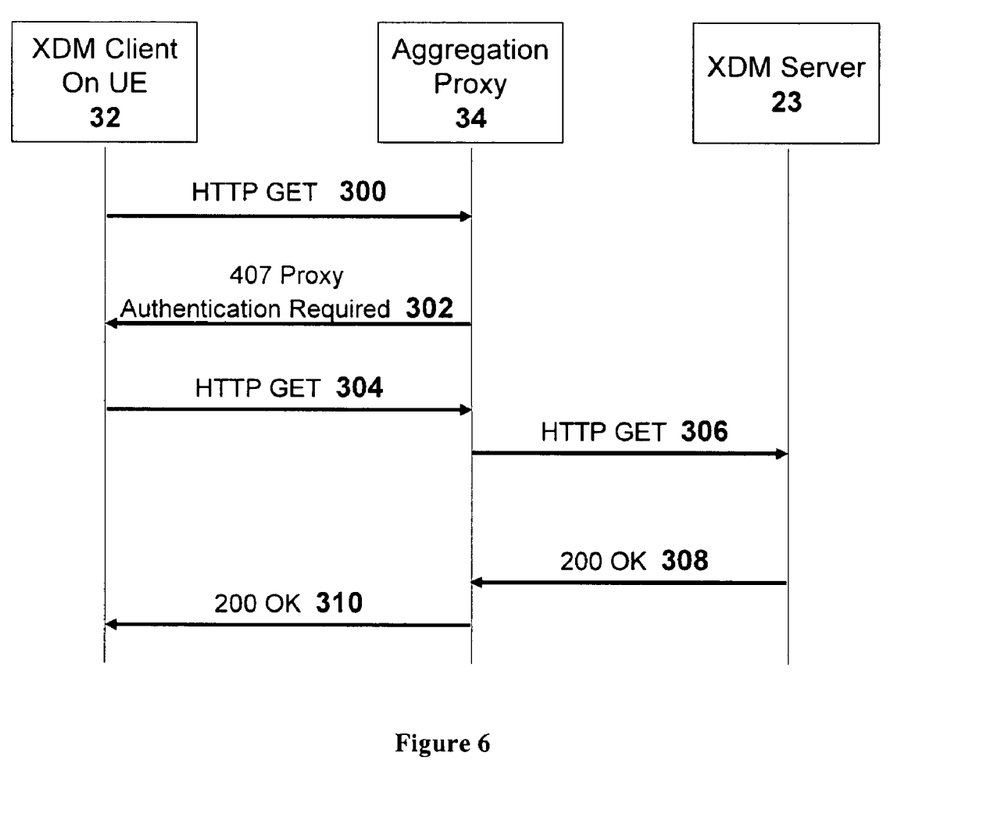
FIG. 6 is a flow chart illustrating the message stream from the XDMC to the PoC XDMS by way of the Aggregation Proxy when user wants to view a call log of the preferred embodiment.

An HTTP GET message is sent to the Aggregation Proxy 34 (step 300) which then authenticates the XDMC 32 (step 302). The XDMC 32 sends another HTTP GET message with authentication information in the header and the Aggregation Proxy 34 establishes that the user requesting the call log is the valid and appropriate user to receive the information (step 304). The HTTP get message is forwarded to the XDMS 23 (step 306) which sends back to the XDMC 32 via Aggregation Proxy 34 a 200 OK message containing the contents of the list (steps 308/310).

Likewise, if the user wants to see a shared call log, the Aggregation Proxy 34 will communicate with the Shared XDMS 26 to retrieve that list. This feature allows users with proper permissions to view call lists not directly associated with them or alternatively combine call listings for different type of services into the same call log. For example, a parent could subscribe to the call log of her child so that she could monitor phone usage, or an employer could subscribe to the call logs of his employees in the same manner. The actions of the Aggregation Proxy 34 and Shared XDMS 26 are defined by the OMA specification, OMA-XDM_Specification-V1_0-20041102-D, identified in the background section of this specification.

Alternate embodiments and added features to the preferred embodiment are possible. Some examples are described below.

Carriers and handset manufacturers can implement the call logs 38 in a variety of formats. There can be separate call logs for calls dialed, calls received, calls missed, and the like or there can be a single call log showing all calls incoming and outgoing with UI features such as icons to differentiate the various call types. Since the call log 38 is like any other contact list defined in the PoC standards, users may initiate calls from it.

Other call log functionality includes the ability to alert the user via XCAP or SMS when the user misses a call that is added to his call log. XCAP notification has the benefit of already being used for contact list updates in accordance with OMA specifications, but requires a packet switched connection to the UE 10. SMS has the benefit of being possible to carry across both packet switched and circuit switched bearer to the UE 10. To initiate the SMS, the terminating Participating PoC Server 14 sends a request over the SCS 18 to the SMS Center at the same time as it adds the call to the call log 38 in the XDMS 23. Both the PoC Server 22 and the SMSC interface with the SCS 18. This requires the ability to deduce the telephone number of the user. This is done with a reverse lookup of SIP to Tel-URI and then stripping off the @domain portion.

In the example of a group call being added to the call log 38, the user can be alerted if the call is still taking place, should he care to join it. In this case, the address to the Controlling PoC Server 16 is in the group id and can be used to send an instant personal alert (using a SIP message) to the PoC Server 22 to check if the group session is still active. This alert is instigated by the user clicking on that entry in the call log 38 or by going into the call log screen. In other words, if the group call is active, this is shown to the user when looking at the call log screen or alternately when selecting the particular call log entry. In the background, UE 10 of the user will send a SIP message to the address that is the group SIP URI and the corresponding PoC server will respond with a SIP INVITE or similar message.

D. Conclusion

Having disclosed exemplary embodiments and the best mode, modifications and variations may be made to the disclosed embodiments while remaining within the subject and spirit of the invention as defined by the following claims.

I claim:

1. In a push-to-talk over cellular (PoC) network, a method for logging Voice Over IP (VOIP) calls from a push-to-talk (PTT) caller client device to a PTT recipient client device, comprising the steps of:
    generating a VOIP call from the PTT caller client device directed to the PTT recipient client device;
    storing identification information associated with the PTT caller client device in a server call log resident on a hyper text transfer protocol (HTTP) server associated with the PTT recipient client device;
    generating an update request at the PTT recipient client device requesting updated call log information associated with the server call log from the HTTP server;
    transmitting the updated call log information from the HTTP server directly to the PTT recipient client device; and
    updating a client call log resident on the PTT recipient client device in response to the updated call log information, wherein the client call log is enabled as a PTT contact list.

2. The method recited in claim 1, wherein the identification information includes a SIP URI of the PTT caller client device, time the VOIP call was generated, date the VOIP call was generated, and nickname of the PTT caller client device.

3. The method recited in claim 1, wherein the server call log is associated with multiple client devices.

4. The method recited in claim 1, wherein the update request is an HTTP GET message.

5. The method recited in claim 1, further comprising the steps of:
    notifying the PTT recipient client device of the presence of a new VOIP call stored in the server call log.

6. The method recited in claim 5, wherein the notifying step transmits a XCAP notification or SMS message to the PTT recipient client device.

7. The method recited in claim 1, further comprising the steps of:
    providing a reject list resident on a server on the cellular network for blocking VOIP calls to the PTT recipient client device;
    determining if the PTT caller client device is on the reject list;
    if the PTT caller client device is on the reject list, blocking the VOIP call from the PTT caller client device;
    if the PTT caller client device is not on the reject list, allowing the VOIP call from the PTT caller client device; and
    if the PTT caller client device is on the reject list, storing identification information associated with the PTT caller client device resident on the HTTP server associated with the PTT recipient client device.

8. The method recited in claim 1, further comprising the steps of:
    providing a do not disturb flag resident on a server on the cellular network for blocking VOIP calls to the PTT recipient client device;
    in response to the VOIP call, determining the status of the do not disturb flag;
    if the do not disturb flag is set to block VOIP calls, blocking the VOIP call from the PTT caller client device and logging the call with reason code "DnD"; and
    if the do not disturb flag is set to allow VOIP calls, allowing the VOIP call caller client device and logging the call with reason code "unavailable" if not successful.

9. The method recited in claim 1, further comprising the steps of:
    subscribing at least one other client device, other than the PTT recipient client device, to the server call log.

10. The method recited in claim 1, further comprising the steps of:
    selecting a caller from the updated call log; and
    generating a SIP Invite message directed to the selected caller.

11. The method recited in claim 10, further comprising the steps of:
    if the selected caller is a group call having an associated SIP URI of a VOIP server, indicating on the recipient caller device whether the group call is active; and
    transmitting a SIP message from the PTT recipient client device to the associated SIP URI.

12. In a push-to-talk over cellular (PoC) network, a method for logging Voice Over IP (VOIP) calls from a push-to-talk (PTT) caller client device to a PTT recipient client device, comprising the steps of:
    generating a VOIP call from the PTT caller client device directed to the PTT recipient client device;
    storing identification information associated with the PTT caller client device in a server call log resident on a hyper text transfer protocol (HTTP) server associated with the PTT recipient client device;
    providing a do not disturb flag resident on a server on the cellular network for blocking VOIP calls to the PTT recipient client device;
    providing a reject list resident on a server on the cellular network for blocking VOIP calls to the PTT recipient client device;
    in response to the VOIP call, determining the status of the do not disturb flag;
    if the do not disturb flag is set to block VOIP calls, blocking the VOIP call from the PTT caller client device;
    if the do not disturb flag is set to allow VOIP calls, determining if the identification information of the PTT caller client device to the reject list;
    if the PTT caller client device is on the reject list, blocking the VOIP call from the PTT caller client device; and
    if the PTT caller client device is not on the reject list, allowing the VOIP call from the PTT caller client device.

13. The method recited in claim 12, further comprising the steps of:
    generating an update request at the PTT recipient client device requesting updated call log information associated with the server call log from the HTTP server;

transmitting the updated call log information from the HTTP server directly to the PTT recipient client device; and updating a client call log resident on the PTT recipient client device in response to the updated call log information, wherein the client call log is enabled as a PTT contact list.

14. The method recited in claim 12, wherein the server call log is associated with multiple client devices.

15. The method recited in claim 13, wherein the update request is an HTTP GET message.

16. The method recited in claim 12, further comprising the steps of:

notifying the PTT recipient client device of the presence of a new VOIP call stored in the server call log.

17. The method recited in claim 16, wherein the notifying step transmits a XCAP or SMS message to the PTT recipient client device.

18. In a push-to-talk over cellular (PoC) network, a hyper text transfer protocol (HTTP) server associated with a push-to-talk (PTT) recipient client device for logging Voice Over IP (VOIP) calls from a PTT caller client device to the PTT recipient client device, comprising:

means for receiving a VOIP call from the PTT caller client device directed to the PTT recipient client device;

means for storing identification information associated with the PTT caller client device in a server call log; and means for transmitting the updated call log information directly to the PTT recipient client device in response to an update request from the PTT recipient client device wherein the updated call log information is stored in a PTT contact list.

19. The server recited in claim 18, wherein the identification information includes a SIP URI of the PTT caller client device, time the VOIP call was generated, date the VOIP call was generated, and nickname of the PTT caller client device.

20. The server recited in claim 18, wherein the server call log is associated with multiple client devices.

21. The server recited in claim 18, wherein the update request is an HTTP GET message.

22. The server recited in claim 18, further comprising:

means for notifying the PTT recipient client device of the presence of a new VOIP call stored in the server call log.

23. The server recited in claim 22, wherein the means for notifying transmits a XCAP or SMS message to the PTT recipient client device.

24. The server recited in claim 18, further comprising:

means for providing a reject list resident for blocking VOIP calls to the PTT recipient client device;

means for determining if the PTT caller client device is on the reject list; and if the PTT caller client device is on the reject list, means for blocking the VOIP call from the PTT caller client device.

25. The server recited in claim 18, further comprising:

means for providing a do not disturb flag for blocking VOIP calls to the PTT recipient client device;

means for providing a reject list for blocking VOIP calls to the PTT recipient client device;

means for determining the status of the do not disturb flag; and if the do not disturb flag is set to block VOIP calls, means for blocking the VOIP call from the PTT caller client device.

26. The server recited in claim 18, further comprising:

means for subscribing at least one other client device, other than the PTT recipient client device, to the server call log.

27. In a push-to-talk over cellular (PoC) network, a hyper text transfer protocol (HTTP) server associated with a push-to-talk (PTT) recipient client device for logging Voice Over IP (VOIP) calls from a PTT caller client device to the PTT recipient client device, comprising:

means for receiving a VOIP call from the PTT caller client device directed to the PTT recipient client device;

means for storing identification information associated with the PTT caller client device in a server call log;

means for providing a do not disturb flag for blocking VOIP calls to the PTT recipient client device;

means for providing a reject list for blocking VOIP calls to the PTT recipient client device;

means for determining the status of the do not disturb flag;

if the do not disturb flag is set to block VOIP calls, means for blocking the VOIP call from the PTT caller client device;

if the do not disturb flag is set to allow VOIP calls, means for determining if the identification information of the PTT caller client device to the reject list;

if the PTT caller client device is on the reject list, means for blocking the VOIP call from the PTT caller client device; and if the PTT caller client device is not on the reject list, means for allowing the VOIP call from the PTT caller client device.

28. The server recited in claim 27, further comprising:

means for transmitting the updated call log information directly to the PTT recipient client device in response to an update request from the PTT recipient client device wherein the updated call log information is stored in a PTT contact list.

29. The server recited in claim 27, wherein the server call log is associated with multiple client devices.

30. The server recited in claim 28, wherein the update request is an HTTP GET message.

31. The server recited in claim 27, further comprising:

means for notifying the PTT recipient client device of the presence of a new VOIP call stored in the server call log.

32. The server recited in claim 31, wherein means for notifying transmits a XCAP or SMS message to the PTT recipient client device.

* * * * *